Figure 1:
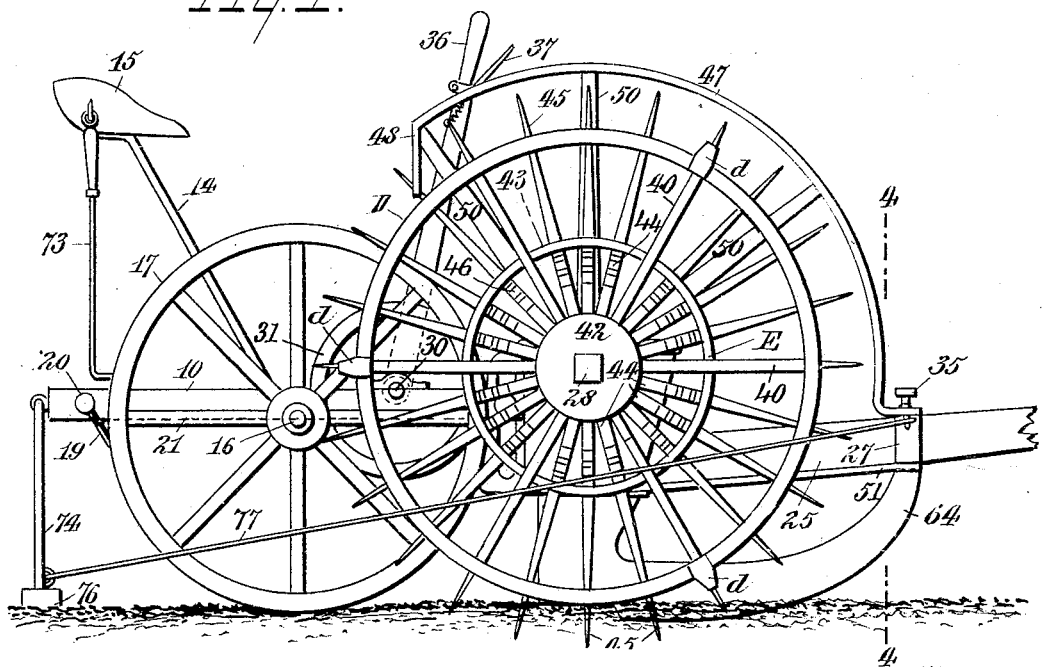

J. H. McCOY.
PLANTER.
APPLICATION FILED JULY 30, 1908.

929,971.

Patented Aug. 3, 1909.
4 SHEETS—SHEET 1.

WITNESSES

INVENTOR
James H. McCoy
BY
ATTORNEYS

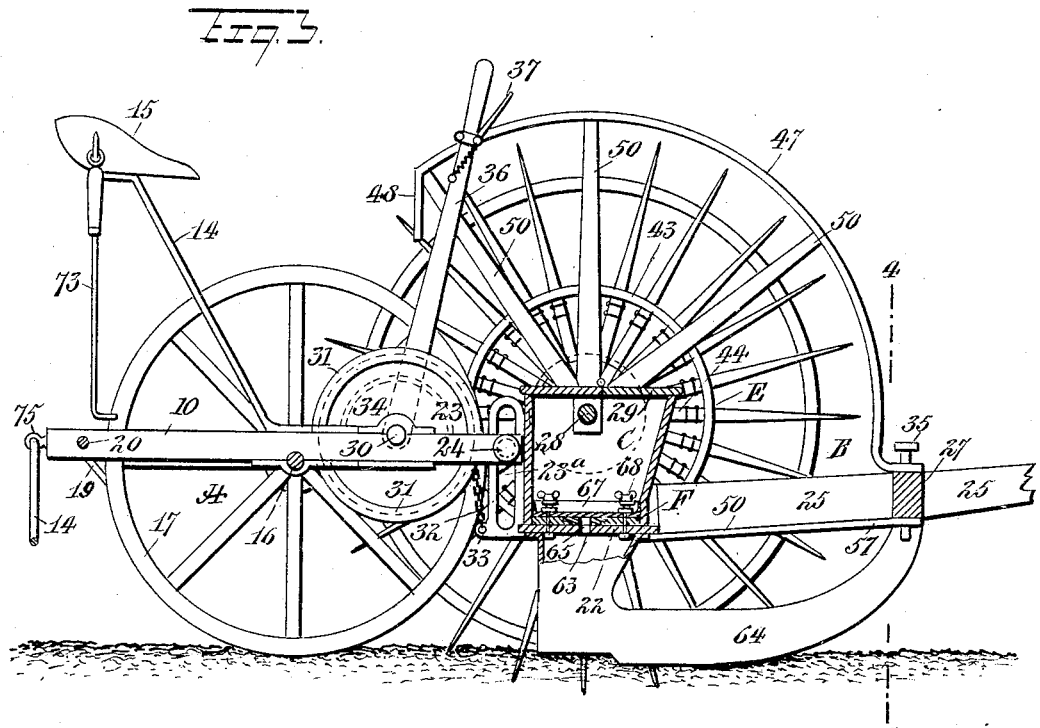

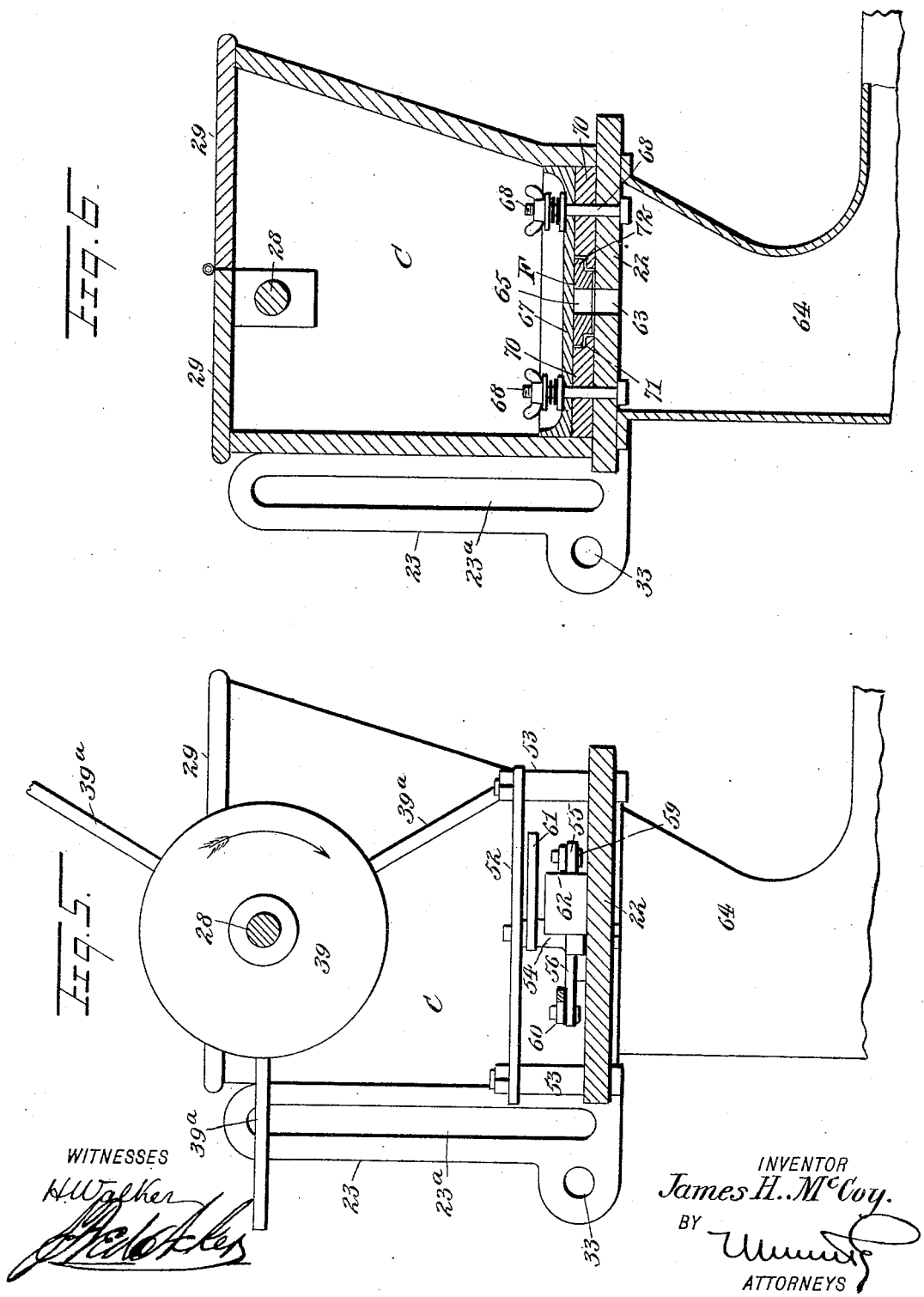

J. H. McCOY.
PLANTER.
APPLICATION FILED JULY 30, 1908.
929,971.
Patented Aug. 3, 1909.
4 SHEETS—SHEET 4.
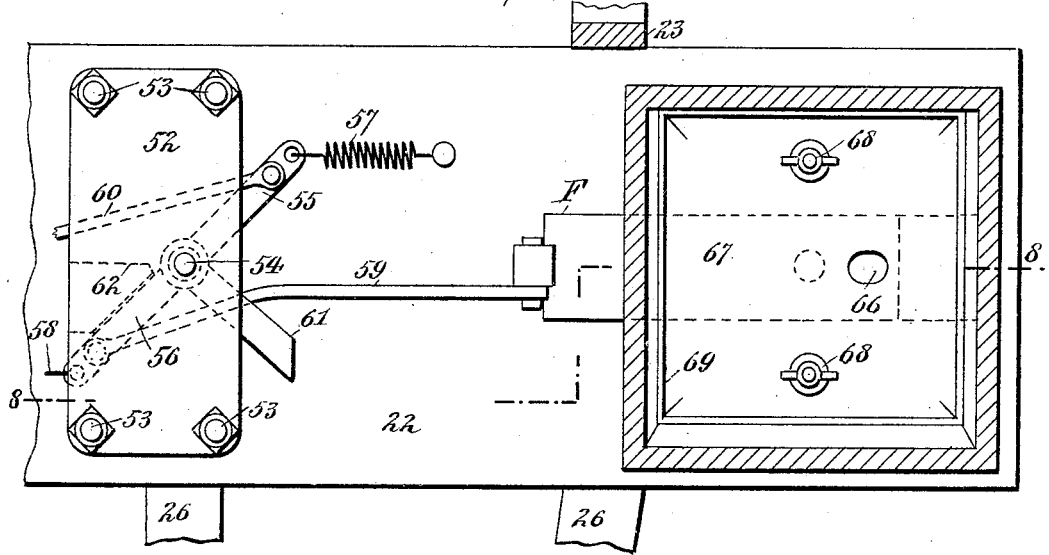
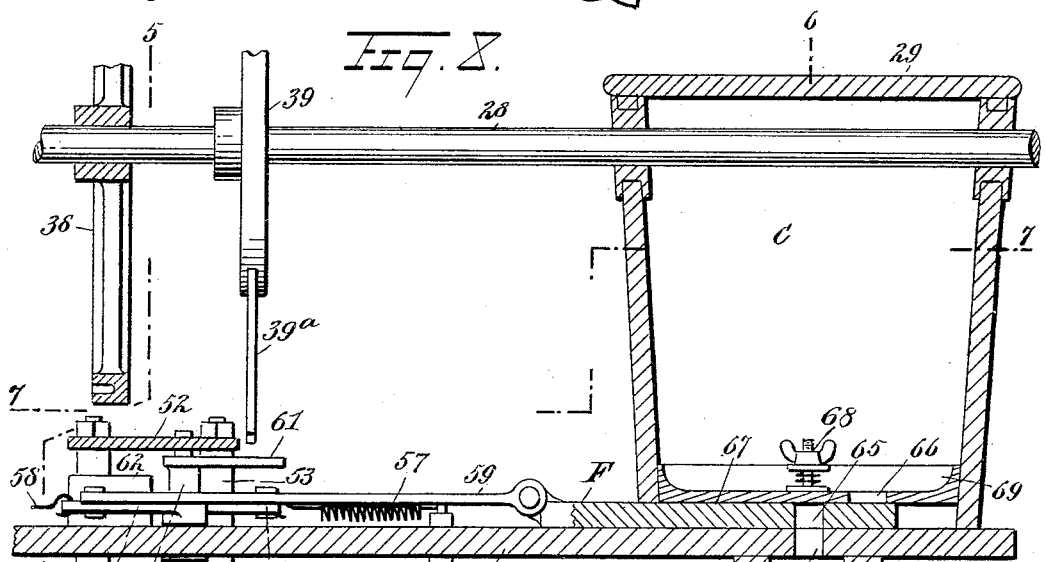
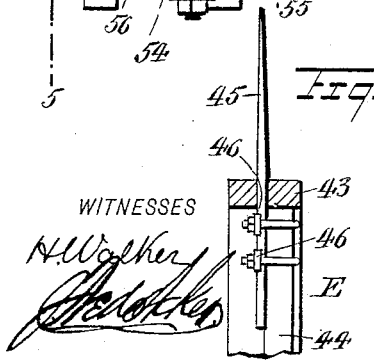
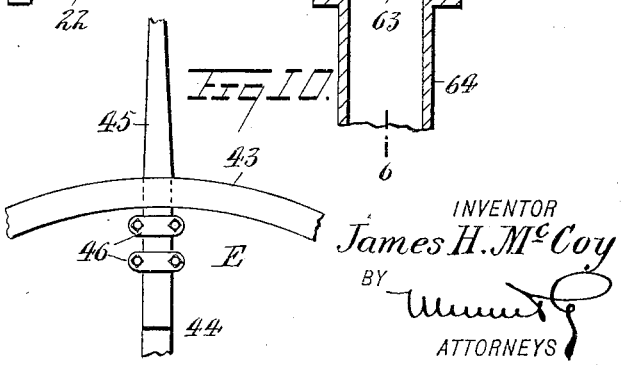
WITNESSES
INVENTOR
James H. McCoy
BY
ATTORNEYS

UNITED STATES PATENT OFFICE.

JAMES H. McCOY, OF ABERDEEN, SOUTH DAKOTA.

PLANTER.

No. 929,971.   Specification of Letters Patent.   Patented Aug. 3, 1909.

Application filed July 30, 1908. Serial No. 446,114.

*To all whom it may concern:*

Be it known that I, JAMES H. McCOY, a citizen of the United States, and a resident of Aberdeen, in the county of Brown and State of South Dakota, have invented a new and Improved Planter, of which the following is a full, clear, and exact description.

My invention relates to certain improvements in planters of the wheel-supported type, and adapted to be motor-propelled or drawn by animals.

The object of the invention is to provide simple and economical check row devices of novel construction and accurate in operation and that will avoid the use of ropes, wires or equivalent guides; and wherein the working mechanism includes means for effectually laying off or marking the rows to be planted.

It is a further purpose of the invention to provide suitable means whereby the operator will have full command of the machine in its passage over any portion of a field.

It is another purpose of the invention to provide efficient means for agitating the grain in the seed boxes, and means for regulating the discharge of seed from said boxes.

It is also a purpose of the invention to provide means for permitting the machine to pass over obstacles in such manner that while it will be at such time wheel-supported, the planting and coöperating mechanism will be elevated and supported in elevated position for the desired period.

Finally, it is a purpose of the invention to so construct a machine of the character described that it will be comparatively simple, reliable in operation, will avoid the waste of seeds and may also be economically constructed.

I desire to be understood as not limiting myself to the particular form of marking devices illustrated, nor the special form of seed controllers, or the details of construction of the machine generally, since the various parts referred to may be changed as to their detail construction and practically the same results be obtained. The construction illustrated, however, is adaptable to the prevailing type of planter and will be reliable under all conditions of service.

The invention consists in the novel construction and combination of parts serving to produce predetermined results under predetermined conditions, as will be hereinafter fully set forth and pointed out in the claims.

Reference is to be had to the accompanying drawings forming a part of this specification, in which similar characters of reference indicate corresponding parts in all the views.

Figure 2:
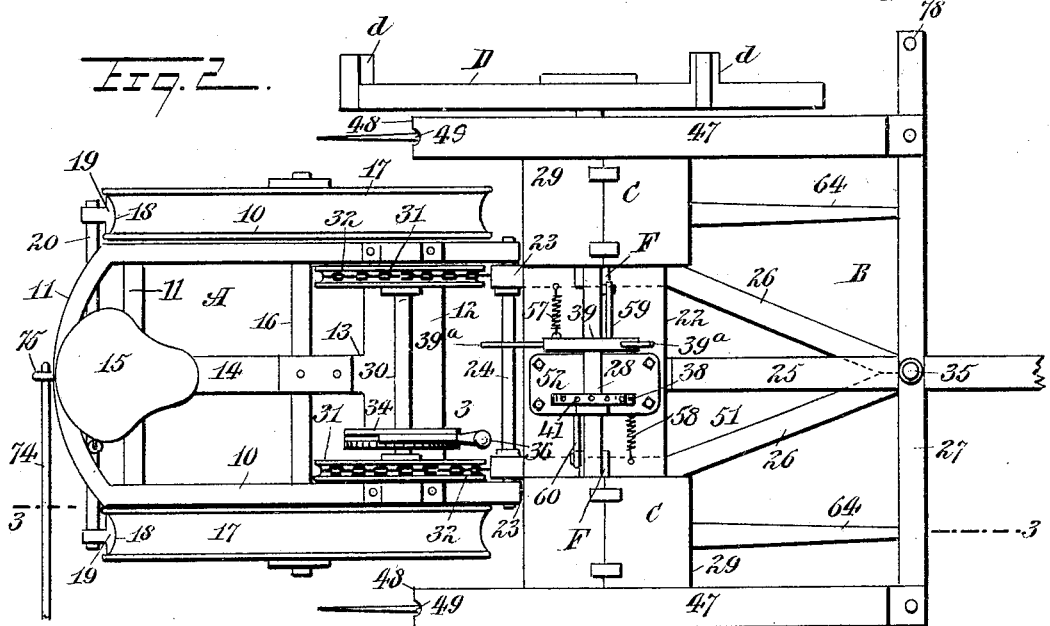

Figure 1 is a side elevation of the planter; Fig. 2 is a plan view of the planter, the marker and intermediate connections being omitted; Fig. 3 is a sectional side elevation of the planter, the section being taken substantially on the line 3—3 of Fig. 2; Fig. 4 is a sectional front elevation of the planter, taken practically on the line 4—4 of Fig. 1; Fig. 5 is an enlarged vertical section, taken practically on the line 5—5 of Fig. 8, and showing the right-hand seed box in side elevation and parts adjacent thereto; Fig. 6 is an enlarged vertical longitudinal section through the right-hand seed box, both boxes being of the same construction, and also a section in the same direction through the immediately associated parts of the seed box, the section being taken practically on the line 6—6 of Fig. 8; Fig. 7 is a detail sectional plan view, the section being taken practically on the line 7—7 of Fig. 8; Fig. 8 is a vertical section through a hopper, the supports therefor and actuating mechanism for the seed drop slide, the section being taken substantially on the line 8—8 of Fig. 7; Fig. 9 is an enlarged fragmentary sectional view of one of the traction elements, whereby to drive the grain-controlling mechanism; and Fig. 10 is a side elevation of the parts shown in Fig. 9.

The frame of the machine is made in two sections, a rear section A and a forward section B, the latter being of greater width than the former, as is shown in Fig. 2. These two frame sections may be made of any suitable material, wood, or metal, or a combination of each, and I do not confine myself to the exact construction of frame shown; but said construction has been found desirable. In the construction illustrated, the rear frame A which is the carrying or wheel frame, is usually constructed as follows: Two side bars 10 are provided, connected by a rear bar 11 and a forward connecting bar or plate 12, together with a longitudinal bar or beam 13, to which a standard 14, for a driver's seat 15, is secured in any approved manner. An axle 16 is journaled in suitable bearings in the side members 10 of the frame A and upon this axle outside of the frame, supporting or ground wheels 17, having peripheral grooves 18, are secured. Mud scrapers 19 adapted to the grooves of the wheels 17, as is shown in Fig. 2, are mounted upon a shaft 20 that turns in a rear portion of the said frame A, as is shown in Fig. 1, and these scrapers are held in place by tensioning cords, cables or the like, shown in dotted lines and indicated by the reference numeral 21 in Fig. 1. These cables or other tensioning devices may be secured to the frame A or any convenient support, in any desired manner. With respect to the forward and wider frame section B, what may be termed a rear bed plate 22 is transversely supported upon a structure comprising a pole or tongue 25, braces 26 that diverge from the forward portion, as is shown in Fig. 2 and extend beneath the bed plate 22 at each side of its center, terminating in the rear of the said bed plate in vertical ears 23, as is shown in Fig. 3, which ears have vertical slots 23$^a$ formed therein; and a draft beam 27, that crosses the tongue or pole 25 forward of the braces 26, as is shown in Fig. 2. A pivotal and vertically-adjustable connection is made between the two frame sections A and B, through the medium of a shaft 24 that loosely passes through the slots 23$^a$ in the ears 23 and is journaled in the forward end portions of the side bars 10 of the rear frame section A. The bed plate 22 supports two seed boxes C, one near each end, and these seed boxes are of peculiar yet like construction, as will be hereinafter particularly described. The seed boxes C are provided with preferably hinged covers 29, and a shaft 28 is passed through the upper and central end portion of the seed boxes, being suitably mounted to turn therein.

The forward section B of the frame is adapted to be raised and lowered bodily, at such time carrying all the working parts connected therewith from contact with the ground, and when a movement in this direction is made, the forward frame may be held elevated as long as desired. At such time, the machine is supported by the rear wheels 17 and the pole or tongue 25, which, as customary, merely serves as a guide for the machine, the forward end of the tongue being held up by the neck yoke that is connected with the collars of the harness in the customary manner. When a team is employed, it draws the machine by being harnessed to a suitable draft tree attached to the draft beam 27 by a suitable pin 35, indicated in Figs. 1, 2 and 3.

The raising and lowering of the forward frame section is by preference accomplished as follows: A shaft 30 is journaled in suitable bearings in the side members 10 of the rear frame, as is best shown in Fig. 2, and upon said shaft within said frame, two drums 31 are secured, each having attached thereto one end of a chain or cable 32, the other ends of said chains being attached to the lower portions of the ears 23, by means of suitable apertured lugs 33, as is shown in Fig. 3. The actual raising and lowering of the forward frame is performed through the medium of a lever 36 secured to the shaft 30 within convenient reach of the driver's seat 15, and which operates in connection with a rack 34, secured to the cross bar or plate 12 and whose teeth are engaged by a thumb latch 37 carried by the lever, in order that the said forward frame section may be held elevated or be allowed to drop. When the front frame section is raised by the said lever and chains, it is absolutely clear of the ground, being supported at one end by the rear wheels 17 and at the other end by the horse collars, neck-yoke and pole.

An adjustment wheel 38, with apertures or recesses 41 through the top or outer surface of the felly, is tightly secured upon the shaft 28 passing through the seed boxes, said wheel being at one side of the center of the machine, as shown in Fig. 4, and at the opposite side of the center upon the same shaft, an escapement wheel 39 is tightly secured, and is shown as provided with three peripheral fingers 39$^a$ at equal distances apart; when used as a check-rower the number of these fingers 39$^a$ must be three permanent fingers and no more and no less, but when used as a drill the number of fingers 39$^a$ is immaterial, and by proper construction of the wheel 39 the number of fingers 39$^a$ may be increased to any number to suit the desired distance apart of the hills of grain to be deposited in the drilled rows. At each outer end of the shaft 28 and beyond the outer side of each seed box C a hill marker in the form of a wheel D is secured. These wheels D are securely and tightly fastened upon the shaft 28, and spokes 40 extend from the hub to the felly, and at the outer face of the felly of each wheel D three outwardly-extending horizontal marking blocks $d$ are formed at equal distances apart, and correspond in number and have a relative position to each of the three permanent fingers 39$^a$ on the wheel 39, when the machine is being used as a check-rower. The marking wheels D revolve with the shaft 28 and are held in position by washers 42 or by similar means. I do not confine myself to the exact construction of the marking wheels D, since any equivalent marking mediums may be employed. The shaft 28 is also provided at each end between the marking wheels D and the seed boxes C, with traction wheels E. These traction wheels are fast upon the shaft 28, and each consists of a suitable hub, a felly 43 and spokes 44, together with a series of pointed extensions or fingers 45 that extend sufficiently far beyond the felly to enter the ground as the machine is moved, and thus rotate the shaft 28. It may be here remarked that the peripheries of the marking wheels D have such relation to the surface of the ground as to slightly touch and make an impression therein. The extensions or fingers 45 project through the fellies 43 of the traction wheels and are held to the spokes by clips or clamps 46, or the equivalents of the same, as is shown in Figs. 9 and 10. A guard 47 is located over each traction wheel E, said guards being secured at their forward ends to the draft beam 27, and supported between their ends by braces 50 secured to the seed boxes C, as is shown in Figs. 1 and 3, or to other convenient supports. At the rear end of each guard 47, a downwardly extending member 48 is provided, having a slot 49 through which the fingers 45 of the traction wheels pass to clear them from substances adhering thereto, as is shown in Fig. 3.

With reference to the seed dropping mechanism, it is best shown in Figs. 5, 6, 7 and 8, and is constructed as follows: A forwardly-tapering and upwardly and forwardly-extending plate 51 is carried from the bed plate 22, forming a rest for the rear or heel section of the pole or tongue 25, as is shown in Fig. 4, and at a central point between the seed boxes C, a housing 52 in the form of a plate is transversely supported upon the bed plate 22 by posts 53, of any desired type. About centrally within the space between said housing and bed plate, a short shaft or stud 54 is mounted to oscillate, and two oppositely-extending and diametrically-located arms 55 and 56 are attached to or are made integral with the said shaft or stud 54. Springs 57 and 58 are respectively secured to the outer end portions of the said arms 55 and 56, which springs extend in opposite directions over the bed plate and are attached thereto. A connecting bar 59 is pivotally attached to the arm 56 and to the seed drop slide F of the right-hand seed box C, viewed from the front, as is shown in Fig. 7, and a second and corresponding connecting bar 60 is similarly pivoted to the arm 55, and to the seed drop slide F of the left-hand seed box C, viewed from the front. The springs for the said arms 55 and 56 hold them normally in a position of rest; that is to say, with the arm 56 for example, against an abutment 62 formed upon or attached to the bed plate 22 beneath the housing 52, as is particularly shown in Fig. 7. The seed drop slides are simultaneously operated to alternately receive and drop seed, by the successive contact of the fingers 39ª of the escapement wheel 39, contacting with a trip arm 61, that is attached to and extends from the short shaft, or oscillating post 54, about centrally between the slide operating arms 55 and 56, as is also shown best in Fig. 7. The trip arm 61 is above the arms 55 and 56, and extends at all times in the path of the escapement fingers, outside of the housing 52. The bed plate 22 is provided with openings 63, one beneath the central portion of each seed box C, and immediately beneath each of said openings 63, the tubular shank of the customary shoe or furrow opener 64 is secured to the bed plate, and receives the seed therefrom in suitable quantities to constitute a hill, and conducts said seed to the ground. The seed drop slides, in their normal or discharge position, have open seed pockets 65 that register with the discharge openings 63 in the bed plate 22, as is shown at the right in Fig. 8; but in the outer or receiving positions of the seed drop slides F and F, their pockets 65 will register with preferably an elongated opening 66 in a false bottom or metal plate 67, one of which is provided for each seed box. These bottom plates are neatly fitted to the lower portions of the seed boxes, and their upper marginal portions 69 slope downward and inward, to facilitate the delivery of seed. The uniform yet substantially rapid movement of the seed drop slides, tends to keep the seed in the boxes C in a suitable state of agitation, yet any form of agitator common to planters may be provided for the boxes, if desired. The plates 67 are usually held in position by thumb screws 68, spring interposing washers bearing on the plates and against the nuts, so that there will be no binding action of the plates against the seed drop slides. The shoes 64 are upturned at their forward ends in the customary manner, and said upturned ends are attached to any convenient support, the draft beam 27 for example, and in operation, the shoes 64 serve as the main supports for the forward section B of the frame, and when said section is elevated, the shoes are carried upward with it. Blocks 70 are located at the front and the rear of each seed box, beneath the bottom plate 67 at each side of the seed delivery opening 63 in the box, as is shown in Fig. 6. The opposing edges 71 of these blocks are recessed to receive corresponding side recessed portions 72 of the seed drop slides and these blocks serve as guides and slideways for the slides.

When the machine is used as a drill, the wheels D and markers d are useless and serve no purpose whatever. At the time when the planter is being constructed, the three marking blocks d are so located tightly upon the wheels D as to plainly mark the ground exactly opposite each hill of grain as the same is dropped by the action of each of the three fingers 39ª, as they one after the other come in contact with the trip arm 61. The markers d always correctly register and mark the location of each hill of grain as the same is dropped into the ground, but it frequently happens that after turning the planter at the ends of the field and when beginning to again cross the field, the markers d do not register correctly, or coincide with the hills or marks made by the markers d in the rows that have already been planted, in which event the position of the wheels must be corrected or adjusted so that the markers $d$ will register or coincide with the marks on the planted portion of the field. This is done by moving the lever 36 rearward until the forward section B has been raised so that all parts of the traction wheels E and the fingers 45 clear the ground, and then by means of a hook 73 hung from the driver's seat, as is shown in Fig. 1, the traction wheels E and the marking wheels D and wheel 39, are all turned together so that the markers $d$ will register and coincide with the marks that have already been made by the markers $d$ on the other planted portions of the field, the bill of the hook being introduced in an aperture 41 in the top of the felly of the wheel 38, in which position the markers $d$ may be moved backward or forward by revolving the shaft 28.

A line marker 76 is provided at the rear of the machine and adapted to extend out at either side, since the shank 74 of said marker is connected with a rotary support 75, at the central rear portion of the rear frame A, and a stay 77, in the form of a cable or chain, is provided for the shank, the forward end of which stay is removably secured to an end of the draft beam 27.

In the general operation of the machine, the marking wheels D having been properly set and the seed boxes supplied with seed, upon starting the machine forward the fingers or teeth of the traction wheels enter the ground, and said wheels are made to revolve and in turn revolve the shaft 28, whereupon the teeth $39^a$ of the escapement wheel 39 act alternately upon the trip arm 61, moving the actuating arms 55 and 56 simultaneously in a direction to force the seed drop slides F outward, bringing their pockets in registry with the openings in the bottom plate 67 of the seed boxes, causing said pockets to be filled with seed, and as the trip arm 61 is released by the escapement wheel, the springs 57 and 58 act to return the actuating arms 55 and 56 to their normal positions, and carry the pockets of the seed drop slides in registry with the openings 63, leading to the shoes, whereupon the seeds are dropped to the ground, the seeds in each pocket constituting a hill.

Having thus described my invention, I claim as new and desire to secure by Letters Patent:

1. In a planter, a fore shoe-supported frame having at its rear end vertically slotted ears, a rear wheel-supported frame provided with a horizontal shaft in its forward part and working loosely in the slotted ears, and means carried by the wheel-supported frame and connected with the rear end of the shoe-supported frame for raising the latter.

2. In a planter, a fore shoe-supported frame, a rear wheel-supported frame pivotally and slidably connected to the shoe-supported frame, drums carried by the wheel-supported frame, cables secured to the drums and to the shoe-supported frame, and means for operating the drums.

3. In a planter, a fore shoe-supported frame having at its rear end vertically slotted members, a rear wheel-supported frame having at its forward end a horizontal shaft working loosely in the slotted members, drums carried by the wheel-supported frame, cables secured to the drums and to the lower ends of the slotted members, and means for operating said drums.

4. In a planter, a fore shoe-supported frame having at its rear end vertically slotted ears provided at their lower ends with apertured lugs, a rear wheel-supported frame having in its front end a horizontal shaft working loosely in the slotted ears, a shaft mounted in the wheel-supported frame, drums on the shaft, chains secured to the drums and to the apertured lugs of the ears, and a lever for operating the shaft carryng the drums.

5. In a planter, a horizontally jointed frame, comprising a rear and a forward section, a rotatory axle carried by the forward section of the frame between one extremity and the joint, grain feeding and distributing devices carried by said forward section of the frame, means for operating the feeding and distributing devices from the said axle, marking and traction wheels also carried by the axle, shoes secured to the forward section of the frame and connected with the grain feeding devices, and a hoist coöperating with the joint and with the grain feeding and distributing devices, for displacing the joint of the said frame and elevating the marking and driving wheels and shoes.

6. In a planter, seed boxes, drop slides therefor, a traction controlled shaft, an escapement wheel upon said shaft, pivoted spring-controlled arms mounted to revolve, connections between said arms and said seed drop slides, and means whereby the said arms are actuated and released by the said escapement wheel.

7. In planters, seed boxes, oppositely-extending spring-controlled actuating arms located between the boxes, a trip arm connected with and extending between the actuating arms, seed drop slides for the boxes, connections between the seed drop slides and the actuating arm, a shaft, means for driving the same, and an escapement wheel on said shaft adapted for engagement with the trip arm.

8. In planters, seed boxes, supports for the same, a shaft journaled in the boxes, traction means for rotating the shaft, seed drop slides for the boxes, tension-controlled rotating arms, a trip member connected with the arms, connections between the arms and the seed drop slides, and an escapement wheel for intermittently actuating the said trip member.

9. In planters, seed boxes, supports for the same, a shaft journaled in said boxes, an escapement wheel upon the shaft, traction means for operating the shaft, connected oppositely-extending tension-controlled actuating arms mounted to oscillate between the boxes, seed drop slides for the boxes, connections between the arms and the seed drop slides, and a trip arm connected with the actuating arms for engagement by said escapement wheel.

10. In a planter, seed boxes, seed drop slides for the boxes, a spring pressed three armed shaft between the seed boxes, a connection between two of the arms and the drop slides, a driven shaft, and an escapement wheel on the shaft and engaging the third arm of the said shaft.

11. In a planter, seed boxes, seed drop slides for the boxes, a three armed shaft between the seed boxes, springs having one end secured to the ends of two of the arms and their other ends to a fixed support, bars connecting the said arms with the seed drop slides, a driven shaft, and an escapement on the shaft and engaging the third arm of the said shaft.

12. In planters, a traction wheel adapted to operate the seed supplying and distributing mechanism, comprising a hub, a felly, spokes extending from the hub to the felly, fingers passing through the felly and engaging the spokes, and clamping devices for the fingers.

13. In a planter, a traction wheel adapted to operate the seed distributing mechanism, having fingers projecting from its felly, and a guard over the traction wheel, said guard having an inwardly extending slotted member at one end, through which slot the fingers of the traction wheels pass.

In testimony whereof I have signed my name to this specification in the presence of two subscribing witnesses.

JAMES H. McCOY.

Witnesses:
  LELAH K. McCoy,
  H. F. McCoy.